(12) United States Patent
Zou et al.

(10) Patent No.: US 12,415,306 B2
(45) Date of Patent: Sep. 16, 2025

(54) BLOW-MOLDING MOLD, BOTTLE BLOWING MACHINE AND PLASTIC BOTTLE

(71) Applicant: GUANGZHOU TECH-LONG PACKAGING MACHINERY CO., LTD, Guangdong (CN)

(72) Inventors: Daqun Zou, Guangdong (CN); Xiaolin Huang, Guangdong (CN)

(73) Assignee: GUANGZHOU TECH-LONG PACKAGING MACHINERY CO., LTD, Guangdong (CN)

( * ) Notice: Subject to any disclaimer, the term of this patent is extended or adjusted under 35 U.S.C. 154(b) by 21 days.

(21) Appl. No.: 18/020,551

(22) PCT Filed: Sep. 29, 2020

(86) PCT No.: PCT/CN2020/118769
§ 371 (c)(1),
(2) Date: Feb. 9, 2023

(87) PCT Pub. No.: WO2022/056960
PCT Pub. Date: Mar. 24, 2022

(65) Prior Publication Data
US 2023/0302711 A1 Sep. 28, 2023

(30) Foreign Application Priority Data

Sep. 17, 2020 (CN) .......................... 202010979443.5
Sep. 17, 2020 (CN) .......................... 202022045751.9

(51) Int. Cl.
*B29C 33/42* (2006.01)
*B29C 49/48* (2006.01)
(Continued)

(52) U.S. Cl.
CPC ............ *B29C 49/482* (2013.01); *B29C 33/42* (2013.01); *B29C 49/48* (2013.01); *B29K 2067/003* (2013.01); *B29L 2031/7158* (2013.01)

(58) Field of Classification Search
None
See application file for complete search history.

(56) References Cited

U.S. PATENT DOCUMENTS

| 3,892,513 A | 7/1975 | Mehnert et al. |
| 6,763,969 B1 | 7/2004 | Melrose et al. |
(Continued)

FOREIGN PATENT DOCUMENTS

| AU | 1069977 A1 * | 1/2001 | ............ B29B 11/08 |
| CA | 2251145 C | 10/2002 | |
(Continued)

OTHER PUBLICATIONS

International Search Report issued in PCT/CN2020/118769 dated Jun. 8, 2021.
(Continued)

*Primary Examiner* — Jacob T Minskey
*Assistant Examiner* — Adrien J Bernard
(74) *Attorney, Agent, or Firm* — Troutman Pepper Locke LLP; Scott D. Wofsy; Gabrielle L. Gelozin

(57) ABSTRACT

Provided are a blow-molding mold, a bottle blowing machine and a plastic bottle, the blow-molding mold has a mold cavity, where a bottle body, a bottle shoulder, a handle and a bottle neck are formed within the mold cavity after a bottle preform is blown, the bottle shoulder is located between the bottle body and the bottle neck, one end of the handle is connected to the bottle shoulder, the other end of the handle is connected to the bottle shoulder or the bottle
(Continued)

neck, and the mold cavity includes a first concave region to have a raised step structure formed on the bottle neck.

20 Claims, 13 Drawing Sheets

(51) Int. Cl.
  *B29K 67/00* (2006.01)
  *B29L 31/00* (2006.01)

(56) References Cited

U.S. PATENT DOCUMENTS

| | | | |
|---|---|---|---|
| 6,789,689 | B1 | 9/2004 | Beale |
| 2017/0081079 | A1* | 3/2017 | Van Dijck ............... B29C 49/08 |
| 2020/0189785 | A1 | 6/2020 | Fonseca et al. |

FOREIGN PATENT DOCUMENTS

| | | |
|---|---|---|
| CN | 1097378 A | 1/1995 |
| CN | 102666291 A | 9/2012 |
| CN | 202448343 U | 9/2012 |
| CN | 107471611 A | 12/2017 |
| CN | 212603332 U | 2/2021 |
| EP | 1069977 B1 | 11/2013 |
| JP | S 48 072267 A | 9/1973 |
| JP | H07314540 A | 12/1995 |
| JP | 2005-067188 A | 3/2005 |
| JP | 2013508230 A | 3/2013 |
| JP | 2023-504055 A | 2/2023 |
| JP | 2023-540166 A | 9/2023 |
| WO | 2019130845 A1 | 7/2019 |

OTHER PUBLICATIONS

Japanese Office Action dated Jan. 25, 2024, issued during the prosecution of Japanese Patent Application No. 2023-504058.
Chinese First Office Action dated Oct. 31, 2024, issued during the prosecution of CN 202010979443.5.
Extended European Search Report dated Jun. 18, 2024, issued during the prosecution of EP 20953818.0.

* cited by examiner

BLOW-MOLDING MOLD, BOTTLE BLOWING MACHINE AND PLASTIC BOTTLE

CROSS-REFERENCE TO RELATED APPLICATIONS

This is a National Stage Application filed under 35 U.S.C. 371 based on International Patent Application No. PCT/CN2020/118769, filed on Sep. 29, 2020, which claims priority to Chinese Patent Application No. 202010979443.5 filed on Sep. 17, 2020 and claims priority to Chinese Patent Application No. 202022045751.9 filed on Sep. 17, 2020, disclosures of all of which are incorporated herein by reference in their entireties.

TECHNICAL FIELD

The present application relate to the field of bottle blowing technologies, for example, a blow-molding mold, a bottle blowing machine and a plastic bottle.

BACKGROUND

At present, plastic feeding bottles with self-contained handles and beverage bottles with self-contained handles on the market are mainly divided into two types, one type is a bottle with a self-contained handle and made of High Density Polyethylene (HDPE) material, and the other type is a bottle with a rear handle and made of a polyethylene glycol terephthalate (PET) material. The bottle with the handle and made of the HDPE material has the defects that sealing is incomplete, a bottle body is easy to damage, and a volume of the bottle cannot be controlled; the other bottle made of the PET material has the advantages of being good in sealing performance, firm in bottle body, high in oxygen barrier performance, transparent, easy to observe and the like compared with the bottle made of the HDPE material, but at present, the bottle made of the PET material needs to be provided with the rear handle, and the handle in the bottle with the rear handle and made of the PET material needs to be produced and installed through a specific equipment and is prone to falling off after being installed. Due to the above reasons, related enterprises in the industry want to replace the bottle with the handle and made of the PET material with the bottle with the rear handle and made of the PET material on the market at present.

In order to ensure that a position of the handle is not changed and the shape is complete, a preform at a handle part of a bottle preform may only be transversely stretched and cannot be longitudinally stretched. Therefore, a technical treatment needs to be performed on the handle part in a bottle preform heating process, and a condition that in a bottle blowing process, the handle part softens after being too high in temperature and thus deforms, and further causes a bottle blowing failure is prevented. The bottle with a self-contained handle and made of the PET material is manufactured by using a two-step bottle blowing process method, that is, the bottle preform is firstly formed by injection molding, and then the bottle preform is blown into the bottle in a blow-molding mold. Compared with a conventional bottle preform, the bottle preform with a self-contained handle has an additional assembly, i.e., the handle, so that problems which do not occur in a conventional bottle preform blowing process may be generated in a bottle preform blowing process. After the bottle preform is blown, a wrinkle is easily formed at a connection of the bottle shoulder opposite to the handle and the bottle neck, so that the quality of the bottle is unqualified.

SUMMARY

The present application provides a blow-molding mold and a bottle blowing machine.

The present application provides a plastic bottle.

An embodiment provides a blow-molding mold. The blow-molding mold includes a mold cavity, where a bottle body, a bottle shoulder, a handle and a bottle neck are formed within the mold cavity after a bottle preform is blown, the bottle shoulder is located between the bottle body and the bottle neck, one end of the handle is connected to the bottle shoulder, and the other end of the handle is connected to the bottle shoulder or the bottle neck, the mold cavity includes a first concave region to have a raised step structure formed on the bottle neck.

As an alternative to the present application, a cavity wall of the mold cavity is provided with at least one first rib to have a first groove formed on the bottle shoulder.

As an alternative to the present application, the at least one first rib is disposed in a direction perpendicular to a height direction of the bottle shoulder.

As an alternative to the present application, a cavity wall of the mold cavity is further provided with at least one second rib to have a non-closed second groove or an annularly closed second groove formed on the bottle body.

As an alternative to the present application, the at least one second rib is disposed on a plane or the at least one second rib is disposed on the cavity wall in a wave shape.

As an alternative to the present application, a number of second ribs is not less than two, and the second ribs are disposed at intervals or partially connected.

As an alternative to the present application, the mold cavity includes a second concave region configured for accommodating the handle.

An embodiment provides a bottle blowing machine. The bottle blowing machine includes the blow-molding mold of any one of the schemes described above.

An embodiment provides a plastic bottle. The plastic bottle is made by the bottle blowing machine described above.

As an alternative to the present application, the plastic bottle is made of PET.

Figure 1:
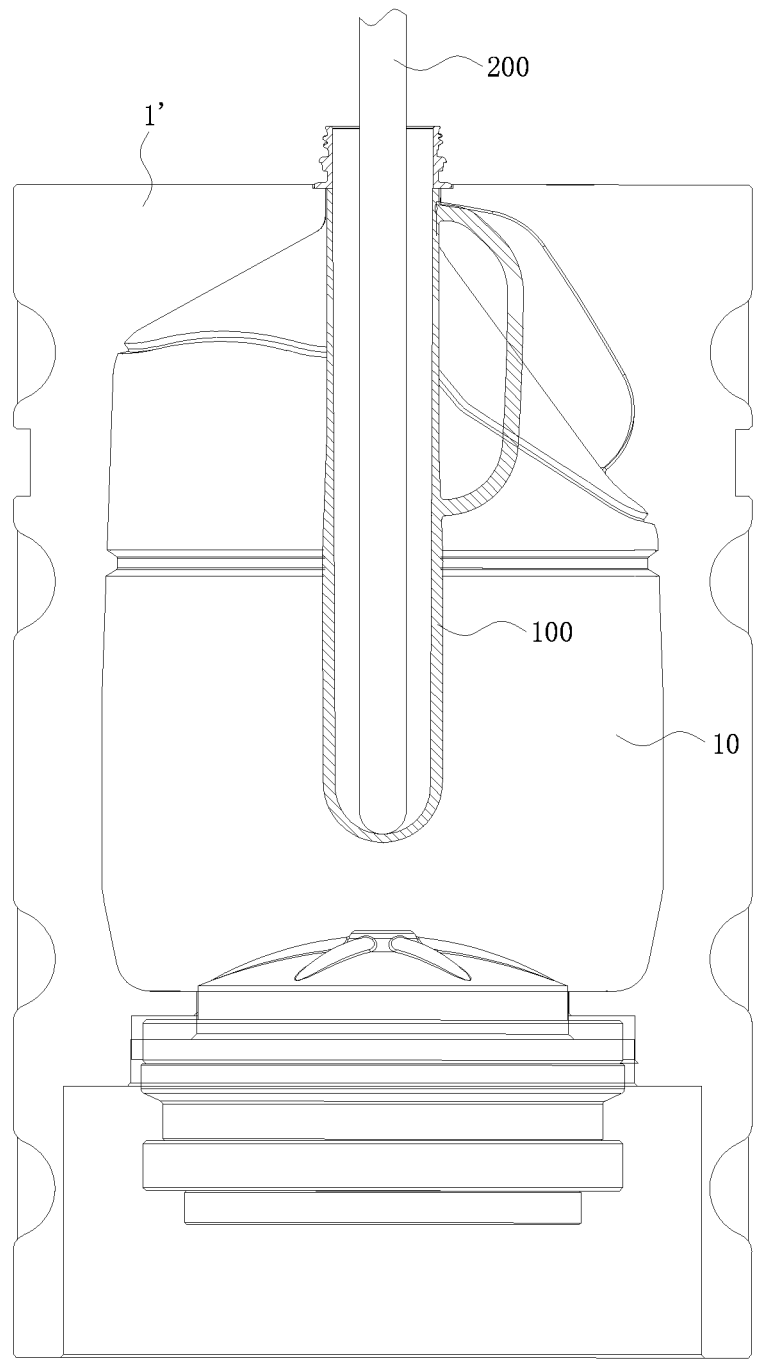
FIG. 1 is a schematic view before blowing a bottle preform with a self-contained handle by using a conventional mold.

In the drawings:
1', Conventional mold;
1, Blow-molding mold;
10, Mold cavity;
11, Left half mold;
12, Right half mold;
13, Bottom mold;
101, First concave region;
102, First rib;
103, Second rib;
104, Second concave region;
105, Third rib;
100, Bottle preform;
100', Plastic bottle;
110, Bottle neck;
120, Bottle shoulder;
1201, Wrinkle;
130, Handle;
140, Bottle body;
200, Stretching rod;
1100, Step structure;
1200, First groove;
1300, Second groove; and
1400, Third groove.

DETAILED DESCRIPTION

A technical scheme of the present application will be further described in conjunction with the drawings and specific embodiments below.

In the present application, unless expressly specified and limited otherwise, a first feature being "above" or "below" a second feature may include the first feature and the second feature being in direct contact, and may also include the first feature and the second feature not being in direct contact but being in contact through an additional feature between them. Moreover, the first feature being "above" the second feature includes the first feature being directly above and obliquely above the second feature, or simply represents that the first feature is at a higher level than the second feature. The first feature being "below" the second feature includes the first feature being directly below and obliquely below the second feature, or simply represents that the first feature is at a lower level than the second feature.

Moreover, the terms "first" and "second" are used for descriptive purposes only and are not to be construed as indicating or implying relative importance or as implicitly indicating a number of technical features indicated. Thus, features defined as "first" or "second" may explicitly or implicitly include one or more such features.

Figure 2:
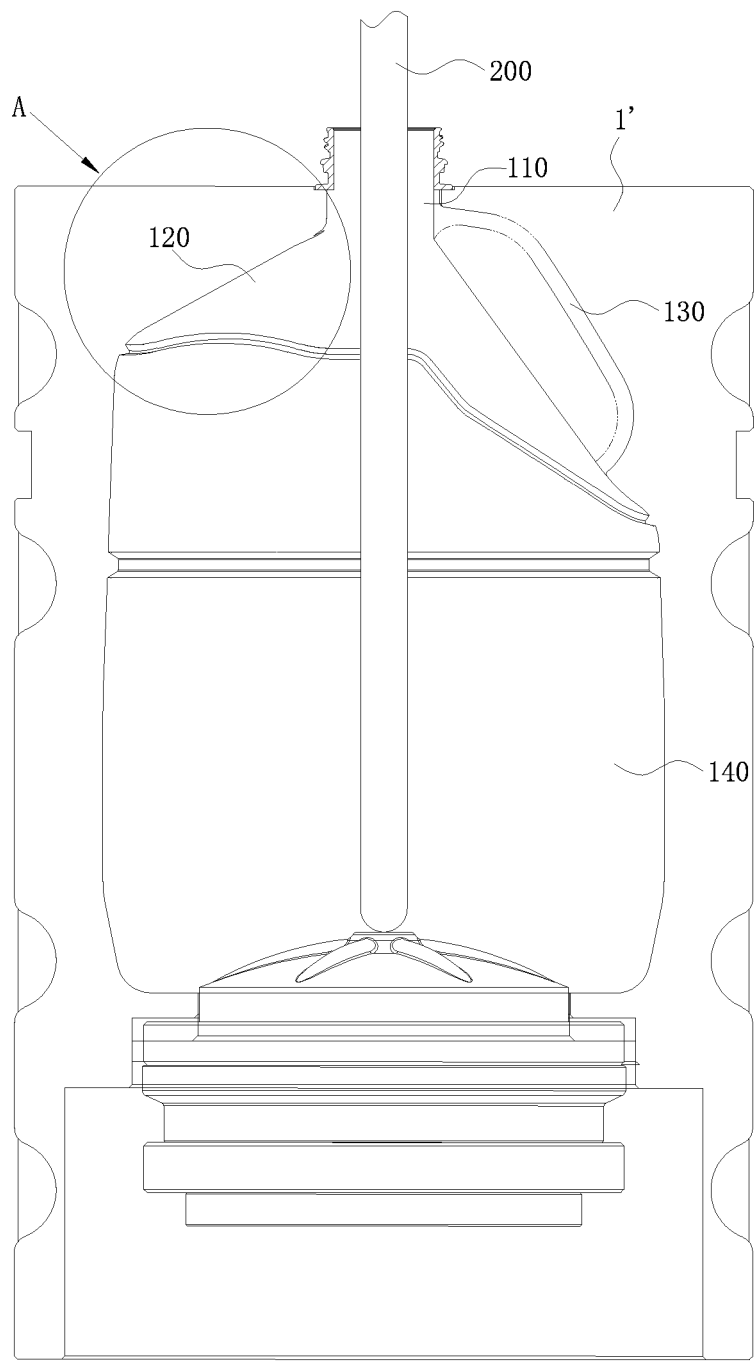
FIG. 2 is a schematic view after blowing a bottle preform with a self-contained handle by using a conventional mold.
Figure 3:
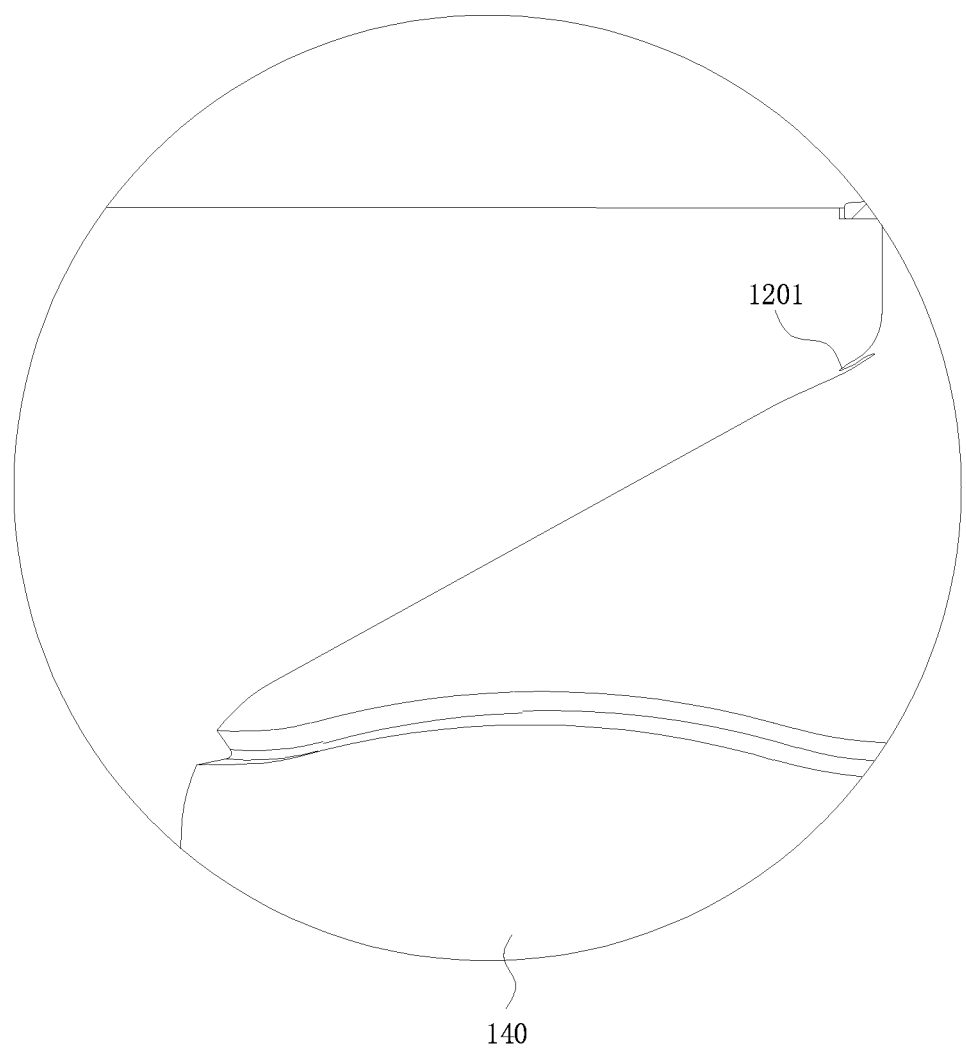
FIG. 3 is an enlarged view at A of FIG. 2.

According to a two-step bottle blowing process, a bottle preform 100 needs to be manufactured firstly, and then a specific mold is used for blowing the bottle preform 100, as shown in FIGS. 1 to 3. When a conventional mold 1' is used for blowing a bottle preform 100 with a self-contained handle 130, due to a fact that the handle 130 is additionally provided, in a stretching and expanding process of the bottle preform 100, a preform at the bottle body 140 part is expanded firstly and fills a lower portion of a mold cavity 10, and at this time, the handle 130 part of the bottle preform 100 is not attached to a cavity wall of the mold cavity 10, and along with blowing, a preform at the bottle body 140 part may push the handle 130 to the cavity wall of the mold cavity 10 under the action of compressed air, and finally the preform and the handle 130 are attached to the cavity wall of the mold cavity 10 together under the action of the compressed air, after a blowing is completed, a wrinkle 1201 (as shown in FIG. 3) is prone to occurring at a connection of the bottle shoulder 120 and the bottle neck 110, thereby a quality defect is caused.

As shown in FIGS. 4 to 7, the blow-molding mold 1 in this embodiment includes the mold cavity 10, where the bottle neck 110, the bottle shoulder 120, the handle 130 and the bottle body 140 are formed within the mold cavity 10 after the bottle preform 100 is blown, the bottle shoulder 120 is located between the bottle neck 110 and the bottle body 140, one end of the handle 130 is connected to the bottle shoulder 120, the other end of the handle 130 is connected to the bottle neck 110, and two ends of the handle 130 may also be connected to the bottle shoulder 120. The cavity wall of the mold cavity 10 is provided with a first concave region 101 to have a raised step structure 1100 formed on the bottle neck 110.

According to the blow-molding mold 1 of this embodiment, the cavity wall of the mold cavity 10 is provided with a first concave region 101 to have the raised step structure 1100 formed on the bottle neck 110, so that more preforms are occupied at this position, thereby a wrinkle 1201 occurring at the connection of the bottle shoulder 120 and the bottle neck 110 is prevented, and the blowing quality of the bottle preform 100 is improved.

Optionally, the cavity wall of the mold cavity 10 is provided with at least one first rib 102 to have a first groove 1200 formed on the bottle shoulder 120. The first rib 102 may limit a preform at the bottle shoulder 120 part from moving towards the bottle neck 110, so that the probability of occurrence of wrinkles 1201 is reduced, and the first groove 1200 may also play a role in enhancing the structural strength of the bottle shoulder 120. Due to the presence of the handle 130, the first rib 102 cannot form a closed annular shape, and thus the first groove 1200 is not in a closed configuration.

Exemplarily, the first rib 102 is disposed in a direction perpendicular to a height direction of the bottle shoulder 120, so that the first rib 102 can better block the preform at the bottle shoulder 120 part from moving towards the bottle neck 110.

Optionally, the cavity wall of the mold cavity 10 is further provided with at least one second rib 103 to have a non-closed or annularly closed second groove 1300 formed on the bottle body 140. Optionally, an arrangement position of the second rib 103 is facing the bottle shoulder 120, so that the second rib 103 can limit the preform at the bottle body 140 part from moving towards the bottle shoulder 120 and the handle 130, the bottle shoulder 120 is prevented from wrinkling, and the handle 130 is prevented from shifting due to the movement of the preform. Moreover, the second groove 1300 also plays a role in enhancing the structural strength of the bottle body 140, and multiple second groove 1300 may be obtained by providing multiple second ribs 103, so that the structural strength of the bottle body 140 is greatly improved, and thus the bottle body 140 is not easy to deform.

Figure 8:
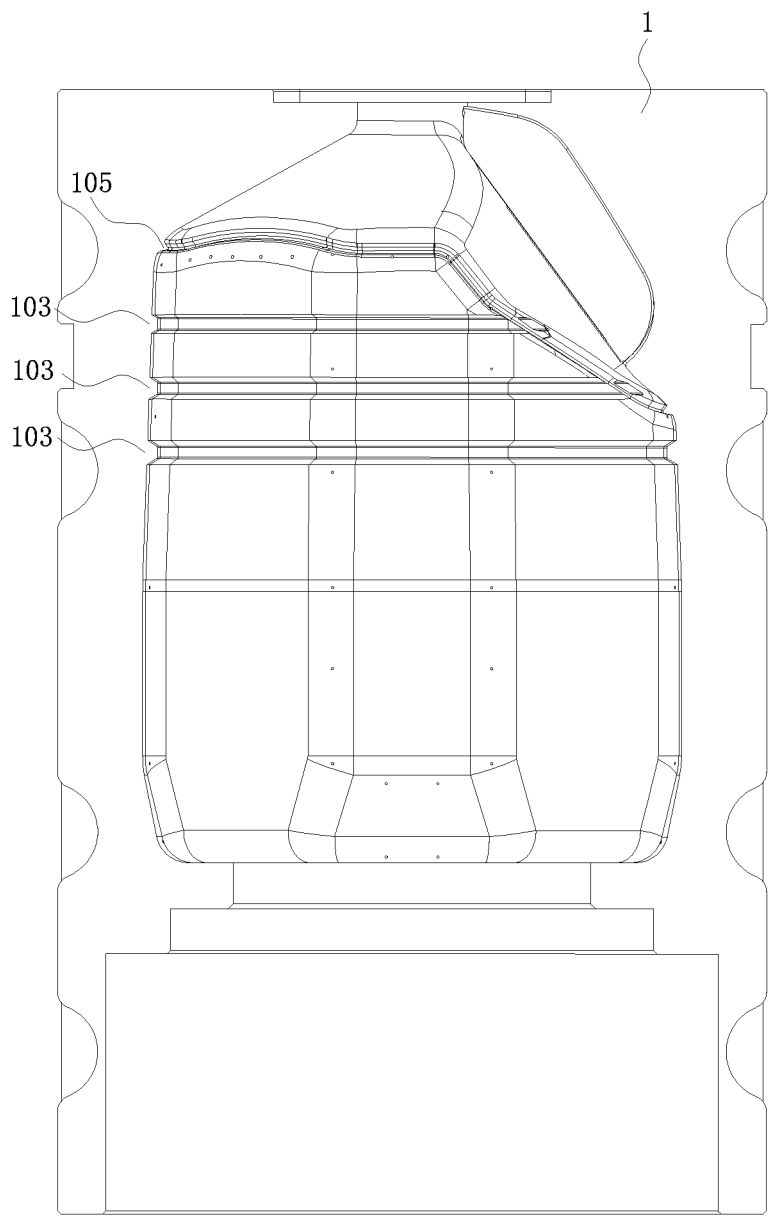
FIG. 8 is a schematic structural view of a mold cavity of a blow-molding mold according to another embodiment of the present application.
Figure 9:
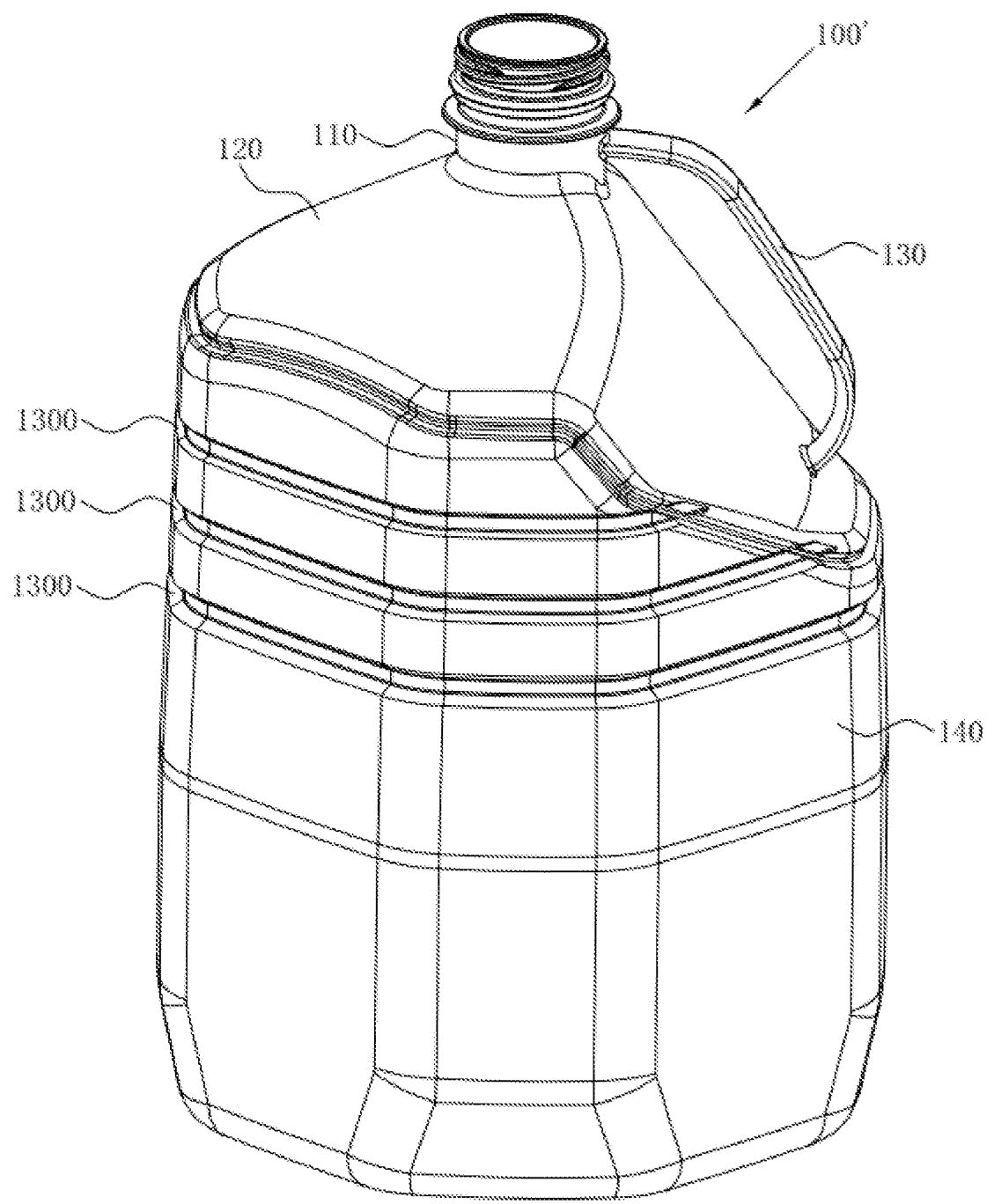
FIG. 9 is a schematic perspective view of a plastic bottle blown by using the blow-molding mold shown in FIG. 8.
Figure 10:
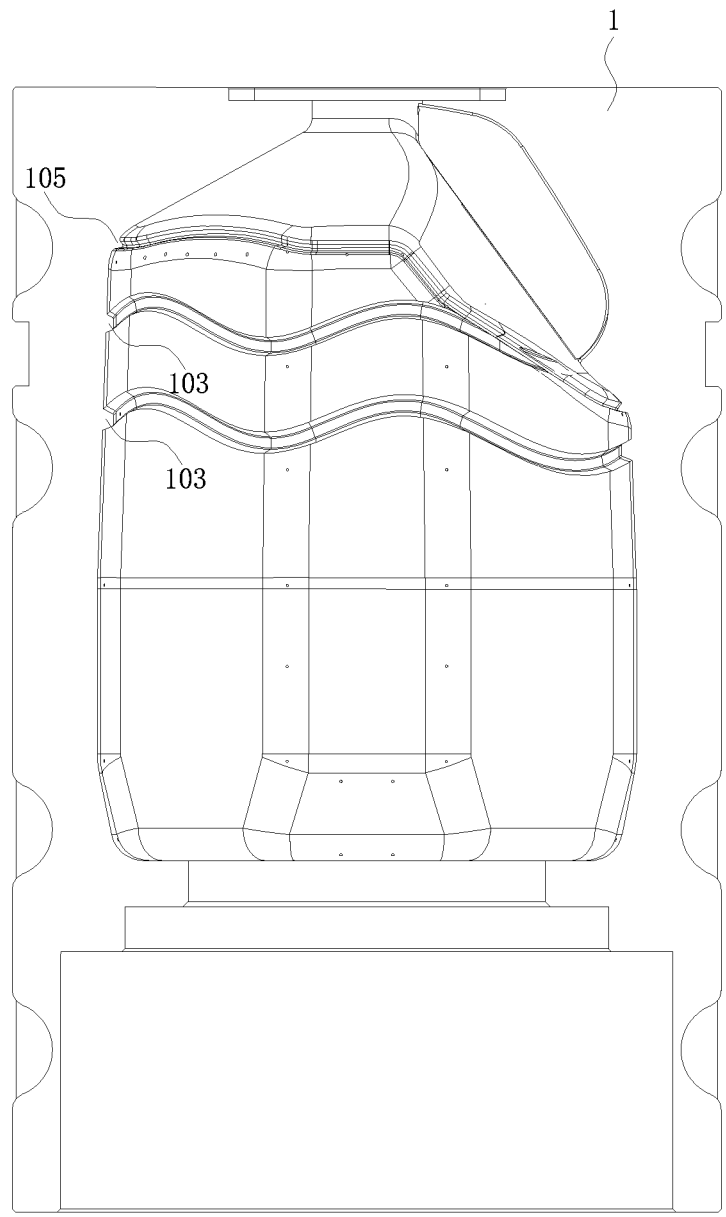
FIG. 10 is a schematic structural view of a mold cavity of a blow-molding mold according to still another embodiment of the present application.
Figure 11:
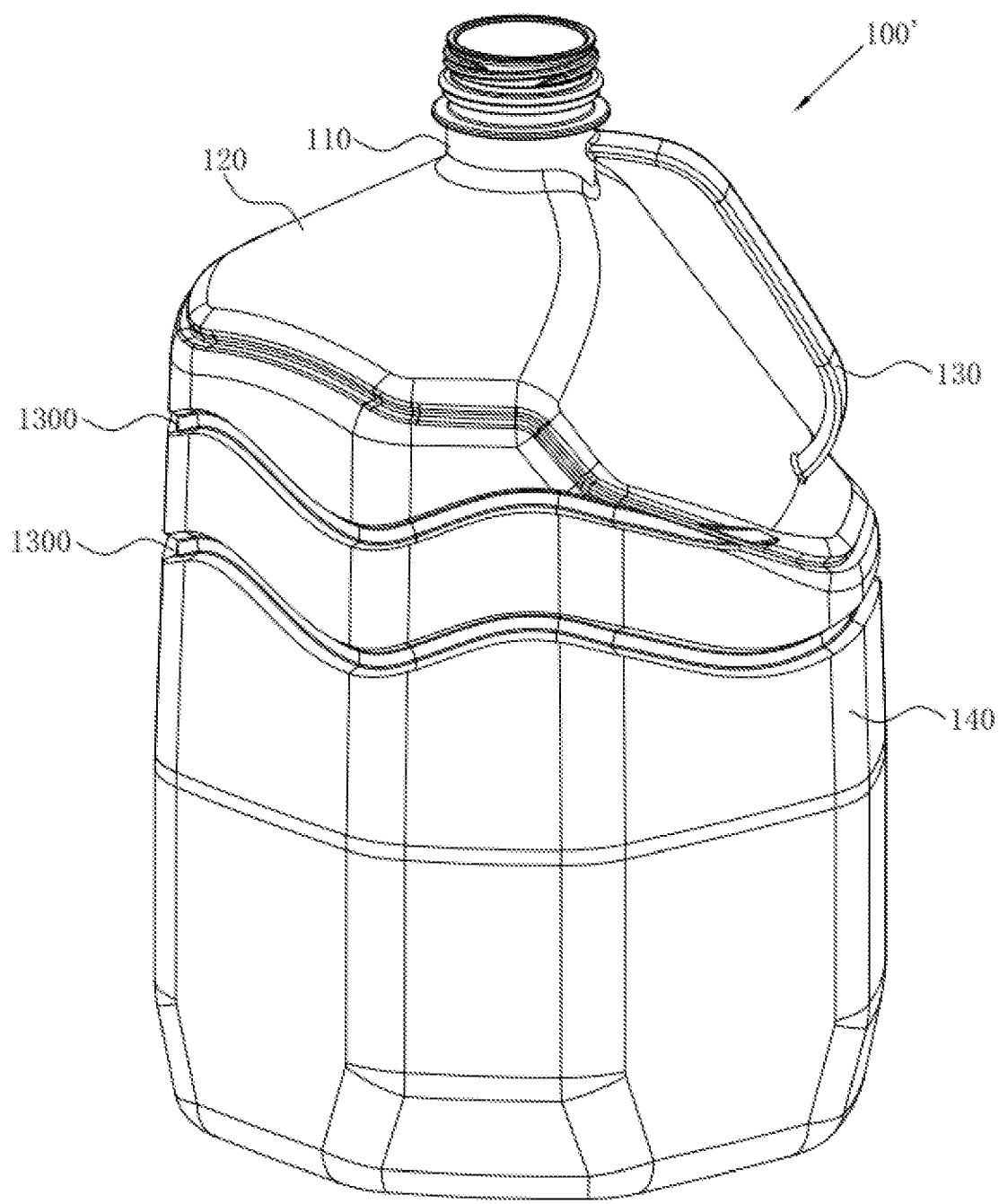
FIG. 11 is a schematic perspective view of a plastic bottle blown by using the blow-molding mold shown in FIG. 10.

Exemplarily, the second rib 103 is disposed on a same plane or the second rib 103 is disposed on the cavity wall of the mold cavity 10 in a wave shape, and a specific shape of the second rib 103 may be flexibly selected according to actual needs. As shown in FIG. 8 and FIG. 9, the second rib 103 has a closed ring shape or a non-closed arc shape, and the second ribs 103 are disposed on a same plane so that heights of the second groove 1300 are the same everywhere. As shown in FIGS. 10 and 11, the second rib 103 exhibits a wave shape, so that the second groove 1300 also exhibit a wave shape, and the second grooves 1300 are not at a same height throughout.

Figure 12:
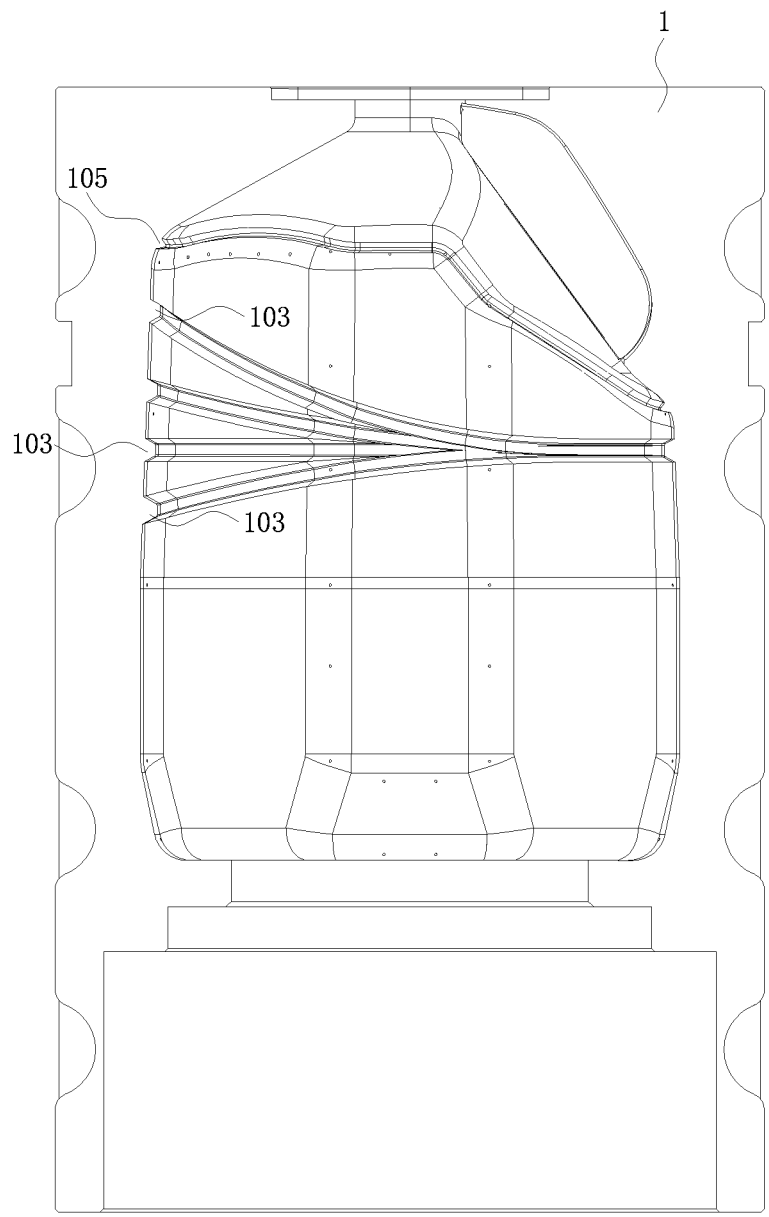
FIG. 12 is a schematic structural view of a mold cavity of a blow-molding mold according to yet another embodiment of the present application.
Figure 13:
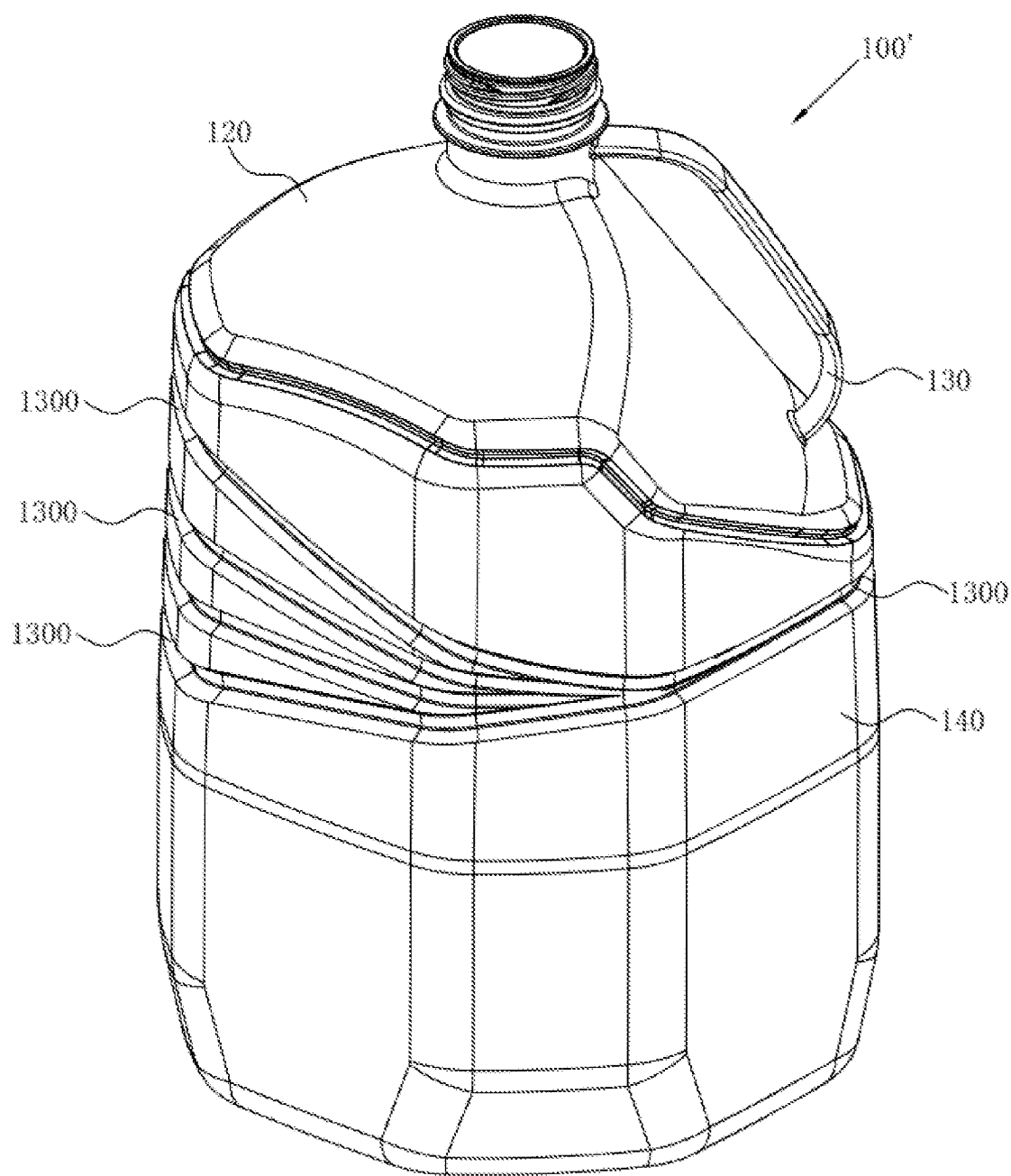
FIG. 13 is a schematic perspective view of a plastic bottle blown by using the blow-molding mold shown in FIG. 12.

When a number of the second ribs 103 is larger than two, the second ribs 103 may be disposed at intervals and may be partially connected together. As shown in FIGS. 12 and 13, the second ribs 103 are partially connected, so that a part of the second grooves 1300 is overlapped.

Figure 4:
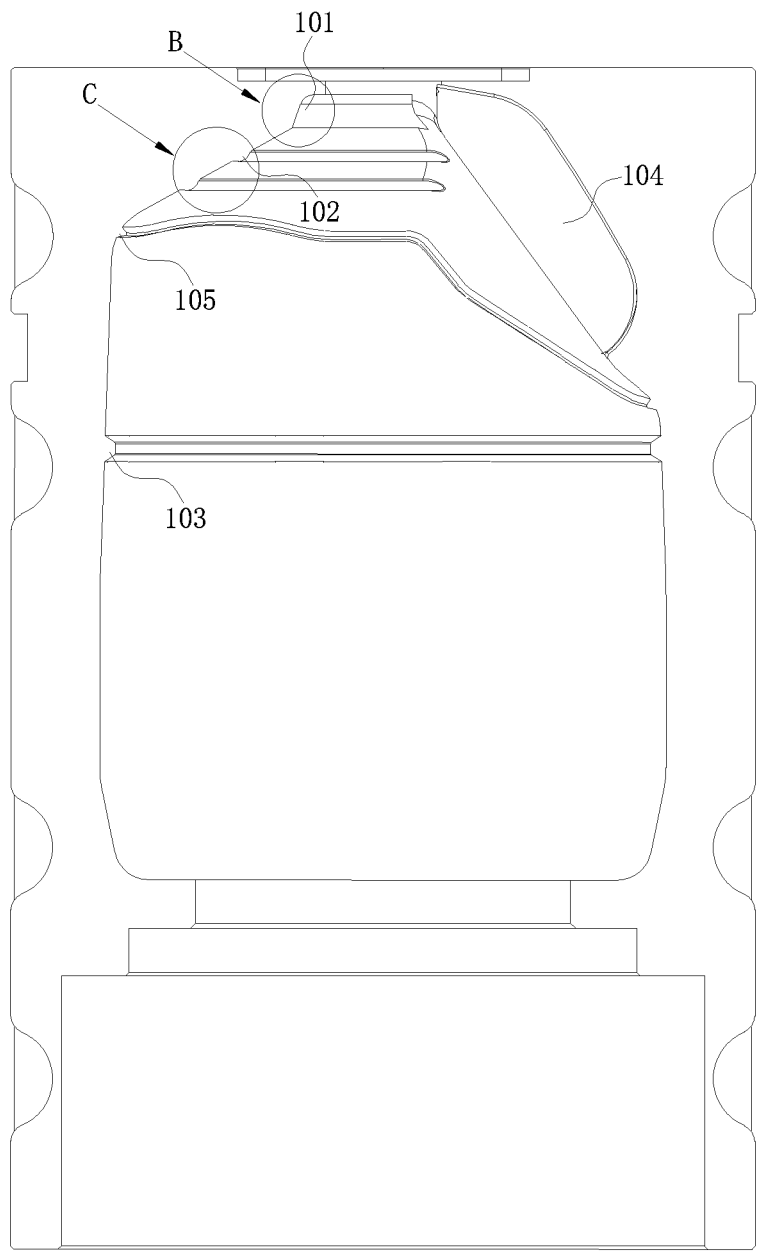
FIG. 4 is a schematic structural view of a mold cavity of a blow-molding mold according to an embodiment of the present application.
Figure 5:
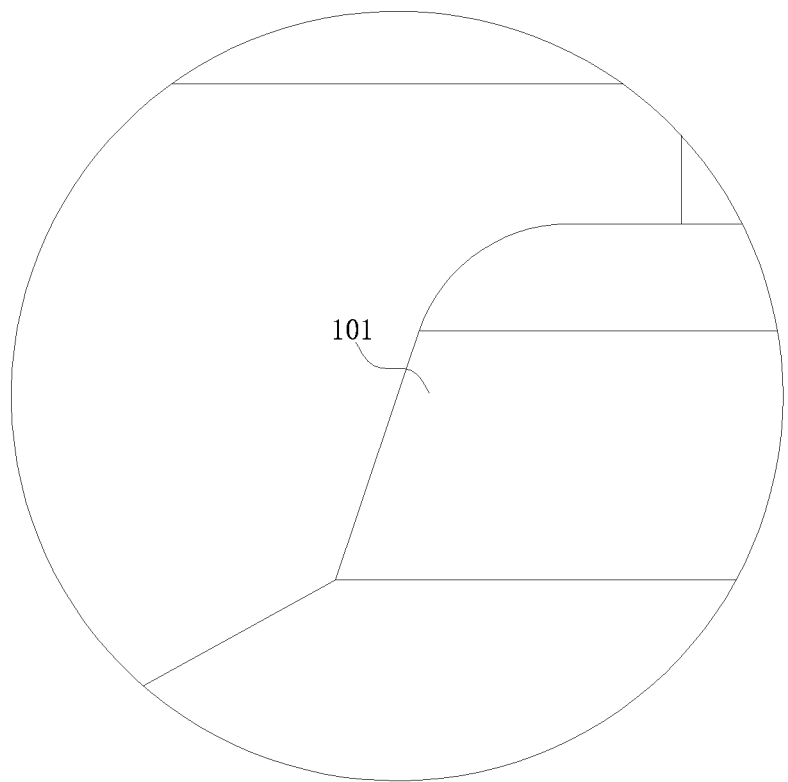
FIG. 5 is an enlarged view at B of FIG. 4.
Figure 6:
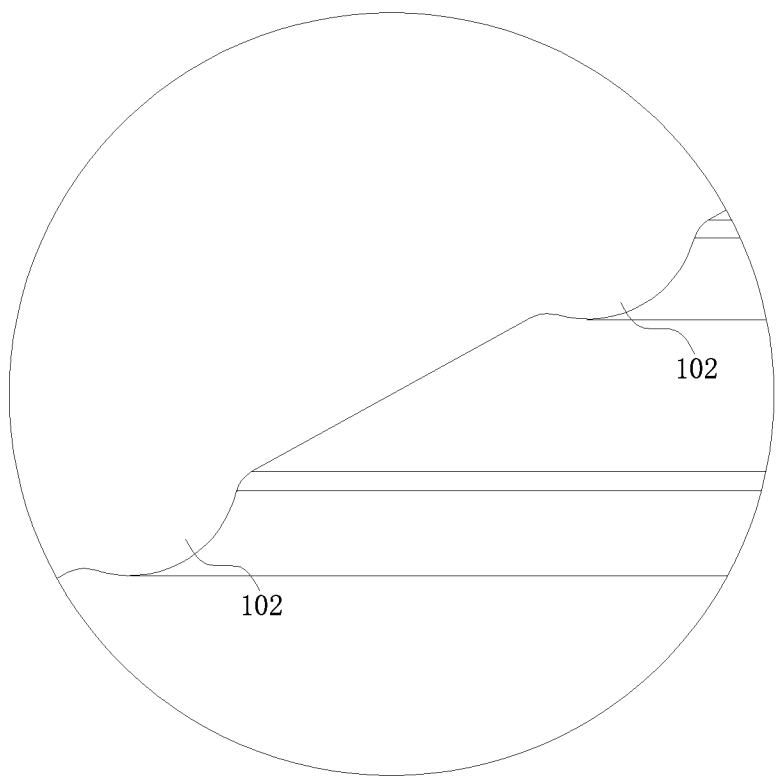
FIG. 6 is an enlarged view at C of FIG. 4.

As shown in FIG. 4, optionally, the mold cavity 10 includes a second concave region 104 configured for accommodating the handle 130. A shape of the second concave region 104 matches a shape of the handle 130 so that the handle 130 may be stopped in a correct position during the blowing process of the bottle preform 100.

Figure 7:
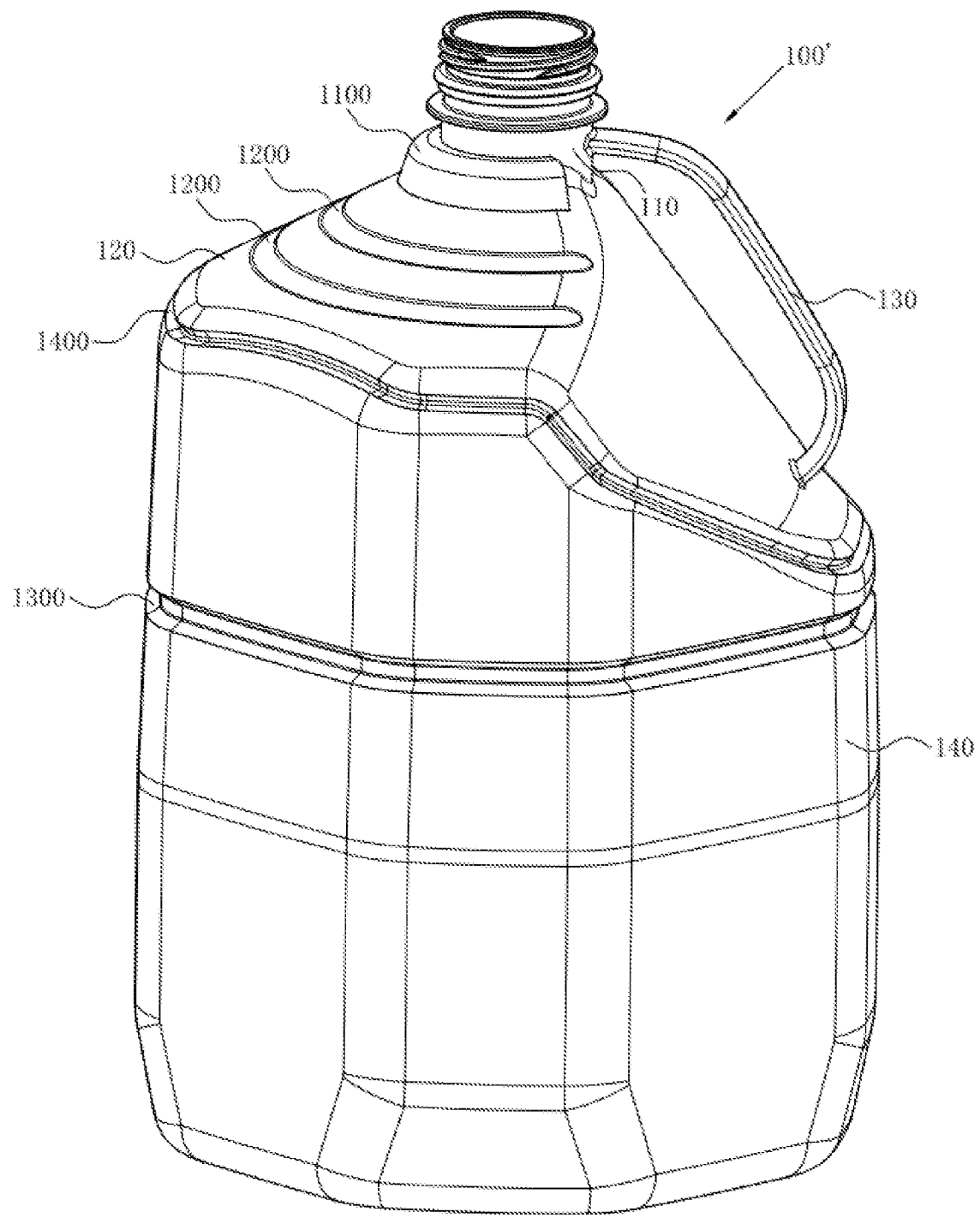
FIG. 7 is a schematic perspective view of a plastic bottle according to an embodiment of the present application.

As shown in FIGS. 4 and 7, in some embodiments, the cavity wall of the mold cavity 10 is provided with a third rib 105 to have a third groove 1400 formed at a connection of the bottle shoulder 120 and the bottle body 140. The third rib 105 functions similar to the second rib 103, and may also limit the preform at the bottle body 140 part from moving towards the bottle shoulder 120, thereby preventing the bottle shoulder 120 from wrinkling.

Figure 14:
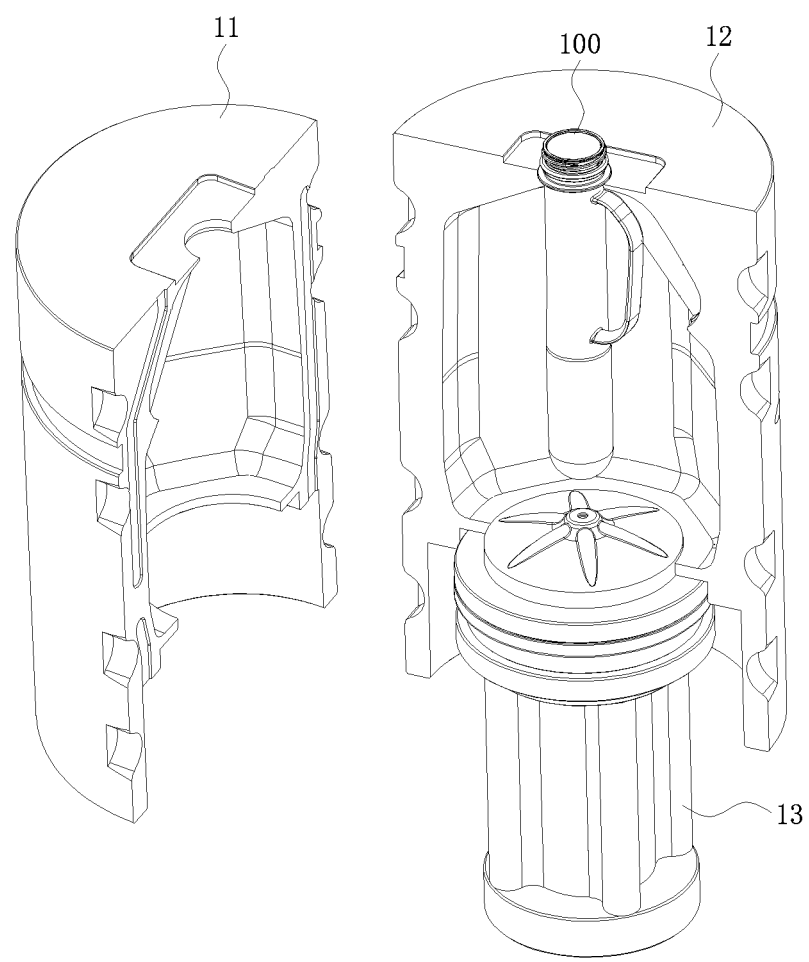
FIG. 14 is a schematic perspective view of a blow-molding mold according to an embodiment of the present application.

Optionally, as shown in FIG. 14, the blow-molding mold 1 includes a left half mold 11, a right half mold 12 and a bottom mold 13, where the left half mold 11, the right half mold 12 and the bottom mold 13 are assembled to form the mold cavity 10. In combination with FIGS. 1 and 2, the bottle preform 100 is blown in the following steps: firstly, the left half mold 11 is separated from the right half mold 12, then the heated bottle preform 100 is placed between the left half mold 11 and the right half mold 12, then the left half mold 11, the right half mold 12 and the bottom mold 13 are closed, and a stretching rod 200 is inserted into the bottle preform 100 from a preform opening to longitudinally stretch the bottle preform 100, and meanwhile, compressed air is blown into the bottle preform 100 from the preform opening to transversely stretch the bottle preform 100, and after the bottle preform 100 is blown, the blow-molding mold 1 is opened.

An embodiment of the present application further provides a bottle blowing machine, the bottle blowing machine includes the blow-molding mold 1 of any one of the embodiments described above, so that the bottle blowing machine may perform the high-quality blowing on the bottle preform 100 with a self-contained handle 130.

As shown in FIG. 7, FIG. 9, FIG. 11 and FIG. 13, an embodiment of the present disclosure further provides a plastic bottle 100', the plastic bottle 100' is made by the bottle blowing machine described above, the plastic bottle 100' has a self-contained handle 130, instead of being in the form of an independent handle which is additionally installed after blowing, whereby the production process is simplified, the production cost is reduced, and a problem that the independent handle falls off is not worried.

Optionally, the plastic bottle 100' is made of PET, so that the plastic bottle 100' has the advantages of being good in sealing performance, firm in bottle body, high in oxygen barrier performance, transparent, easy to observe and the like.

As a preferred implementation of the present application, in the description of this specification, a description referring to the term "preferred" and the like means that a specific feature, structure, material, or characteristic described in conjunction with the embodiment or example is included in at least one embodiment or example of the present application. In the present specification, schematic recitations of the above terms do not necessarily refer to the same embodiment or example. Moreover, the specific features, structures, materials, or characteristics described may be combined in a suitable manner in any one or more embodiments or examples.

What is claimed is:

1. A blow-molding mold, comprising a mold cavity, wherein a bottle body, a bottle shoulder, a handle and a bottle neck are formed within the mold cavity after a bottle preform is blown, the bottle shoulder is located between the bottle body and the bottle neck, one end of the handle is connected to the bottle shoulder, and another end of the handle is connected to the bottle neck, the mold cavity is provided with a first concave region to have a raised step structure formed on the bottle neck below the other end of the handle.

2. The blow-molding mold of claim 1, wherein a cavity wall of the mold cavity is provided with at least one first rib, to have at least one first groove formed on the bottle shoulder.

3. The blow-molding mold of claim 2, wherein the at least one first rib is disposed in a direction perpendicular to a height direction of the bottle shoulder.

4. The blow-molding mold of claim 1, wherein a cavity wall of the mold cavity is further provided with at least one second rib to have a non-closed second groove or an annularly closed second groove formed on the bottle body.

5. The blow-molding mold of claim 4, wherein the at least one second rib is disposed on a same plane or the at least one second rib is disposed on the cavity wall in a wave shape.

6. The blow-molding mold of claim 4, wherein a number of second ribs is not less than two, and the second ribs are disposed at intervals or partially connected.

7. The blow-molding mold of claim 1, wherein the mold cavity comprises a second concave region configured for accommodating the handle.

8. A bottle blowing machine, comprising a blow-molding mold, wherein the blow-molding mold comprises a mold cavity, wherein a bottle body, a bottle shoulder, a handle and a bottle neck are formed within the mold cavity after a bottle preform is blown, the bottle shoulder is located between the bottle body and the bottle neck, one end of the handle is connected to the bottle shoulder, and another end of the handle is connected to the bottle neck, the mold cavity is provided with a first concave region to have a raised step structure formed on the bottle neck below the other end of the handle.

9. A plastic bottle, made by a bottle blowing machine comprising a blow-molding mold, wherein the blow-molding mold comprises a mold cavity, wherein a bottle body, a bottle shoulder, a handle and a bottle neck are formed within the mold cavity after a bottle preform is blown, the bottle shoulder is located between the bottle body and the bottle neck, one end of the handle is connected to the bottle shoulder, and another end of the handle is connected to the bottle neck, the mold cavity is provided with a first concave region to have a raised step structure formed on the bottle neck below the other end of the handle.

10. The plastic bottle of claim 9, wherein the plastic bottle is made of polyethylene glycol terephthalate (PET).

11. The bottle blowing machine of claim 8, wherein a cavity wall of the mold cavity is provided with at least one first rib, to have at least one first groove formed on the bottle shoulder.

12. The bottle blowing machine of claim 11, wherein the at least one first rib is disposed in a direction perpendicular to a height direction of the bottle shoulder.

13. The bottle blowing machine of claim 8, wherein a cavity wall of the mold cavity is further provided with at least one second rib to have a non-closed second groove or an annularly closed second groove formed on the bottle body.

14. The bottle blowing machine of claim 13, wherein the at least one second rib is disposed on a same plane or the at least one second rib is disposed on the cavity wall in a wave shape.

15. The bottle blowing machine of claim 13, wherein a number of second ribs is not less than two, and the second ribs are disposed at intervals or partially connected.

16. The bottle blowing machine of claim 8, wherein the mold cavity comprises a second concave region configured for accommodating the handle.

17. The plastic bottle of claim 9, wherein a cavity wall of the mold cavity is provided with at least one first rib, to have at least one first groove formed on the bottle shoulder.

18. The plastic bottle of claim 17, wherein the at least one first rib is disposed in a direction perpendicular to a height direction of the bottle shoulder.

19. The plastic bottle of claim 9, wherein a cavity wall of the mold cavity is further provided with at least one second rib to have a non-closed second groove or an annularly closed second groove formed on the bottle body.

20. The plastic bottle of claim 19, wherein the at least one second rib is disposed on a same plane or the at least one second rib is disposed on the cavity wall in a wave shape.

* * * * *